United States Patent
Lee et al.

(10) Patent No.: US 10,673,600 B2
(45) Date of Patent: Jun. 2, 2020

(54) METHOD AND APPARATUS FOR HANDLING ABNORMAL SITUATIONS AT CELL OF UNLICENSED CARRIER IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 15/517,394

(22) PCT Filed: Oct. 27, 2015

(86) PCT No.: PCT/KR2015/011364
§ 371 (c)(1),
(2) Date: Apr. 6, 2017

(87) PCT Pub. No.: WO2016/068569
PCT Pub. Date: May 6, 2016

(65) Prior Publication Data
US 2018/0227109 A1 Aug. 9, 2018

Related U.S. Application Data

(60) Provisional application No. 62/072,448, filed on Oct. 30, 2014.

(51) Int. Cl.
*H04L 5/00* (2006.01)
*H04W 28/02* (2009.01)
(Continued)

(52) U.S. Cl.
CPC .......... *H04L 5/0098* (2013.01); *H04L 5/0073* (2013.01); *H04W 28/02* (2013.01);
(Continued)

(58) Field of Classification Search
CPC ............... H04L 5/0098; H04L 5/0073; H04W 52/0206; H04W 24/10
See application file for complete search history.

(56) References Cited

U.S. PATENT DOCUMENTS

2010/0130219 A1* 5/2010 Cave ................. H04W 72/02
455/450
2011/0026422 A1* 2/2011 Ma ................. H04W 72/0453
370/252
(Continued)

FOREIGN PATENT DOCUMENTS

WO   WO 2012/023839 A2   2/2012
WO   WO 2014/044436 A1   3/2014
WO   WO 2014/110813 A1   7/2014

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Section 5.5 of 3GPP TS 36.300 V12.1.0 (Mar. 2014), total 4 pages.
(Continued)

*Primary Examiner* — Ricky Q Ngo
*Assistant Examiner* — Kabir U Jahangir
(74) *Attorney, Agent, or Firm* — Birch, Stewart, Kolasch & Birch, LLP

(57) ABSTRACT

A method and apparatus for deactivating a cell of an unlicensed carrier in a wireless communication system is provided. A user equipment (UE) deactivates a second cell when one of events occurs, and reports information on the second cell to a first cell. The first cell is a first serving cell
(Continued)

on a licensed carrier, and the second cell is a second serving cell on the unlicensed carrier.

5 Claims, 7 Drawing Sheets

(51) Int. Cl.
 H04W 24/10 (2009.01)
 H04W 52/02 (2009.01)
(52) U.S. Cl.
 CPC ........ H04W 24/10 (2013.01); H04W 52/0206 (2013.01); Y02D 70/10 (2018.01); Y02D 70/1224 (2018.01); Y02D 70/1226 (2018.01); Y02D 70/1242 (2018.01); Y02D 70/1262 (2018.01); Y02D 70/14 (2018.01); Y02D 70/142 (2018.01); Y02D 70/146 (2018.01); Y02D 70/23 (2018.01); Y02D 70/24 (2018.01)

(56) References Cited

U.S. PATENT DOCUMENTS

2014/0192643 A1* 7/2014 Kalapatapu ........... H04W 48/00
 370/230
2014/0254524 A1 9/2014 Cheng et al.
2015/0230286 A1* 8/2015 Feuersaenger .... H04W 72/1215
 370/252

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Section 7.5 of 3GPP TS 36.300 V12.1.0 (Mar. 2014), total 4 pages.
Ericsson, "Handling of cell Activation/Deactivation in Dual connectivity", R2-141161, 3GPP TSG-RAN WG2 #85bis, Valencia, Spain, Mar. 31-Apr. 4, 2014, total 4 pages.

* cited by examiner

[Fig. 1]
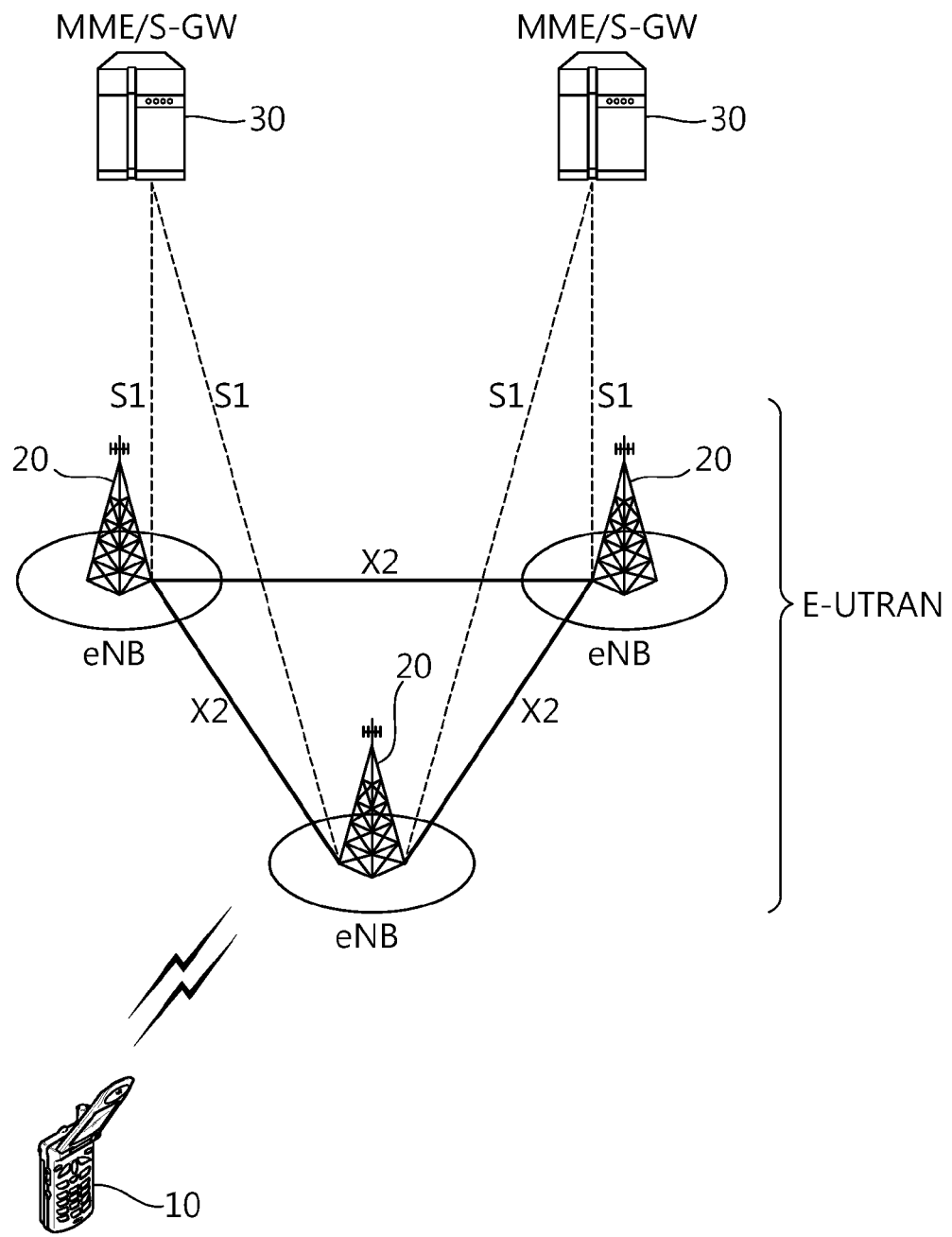

[Fig. 2]
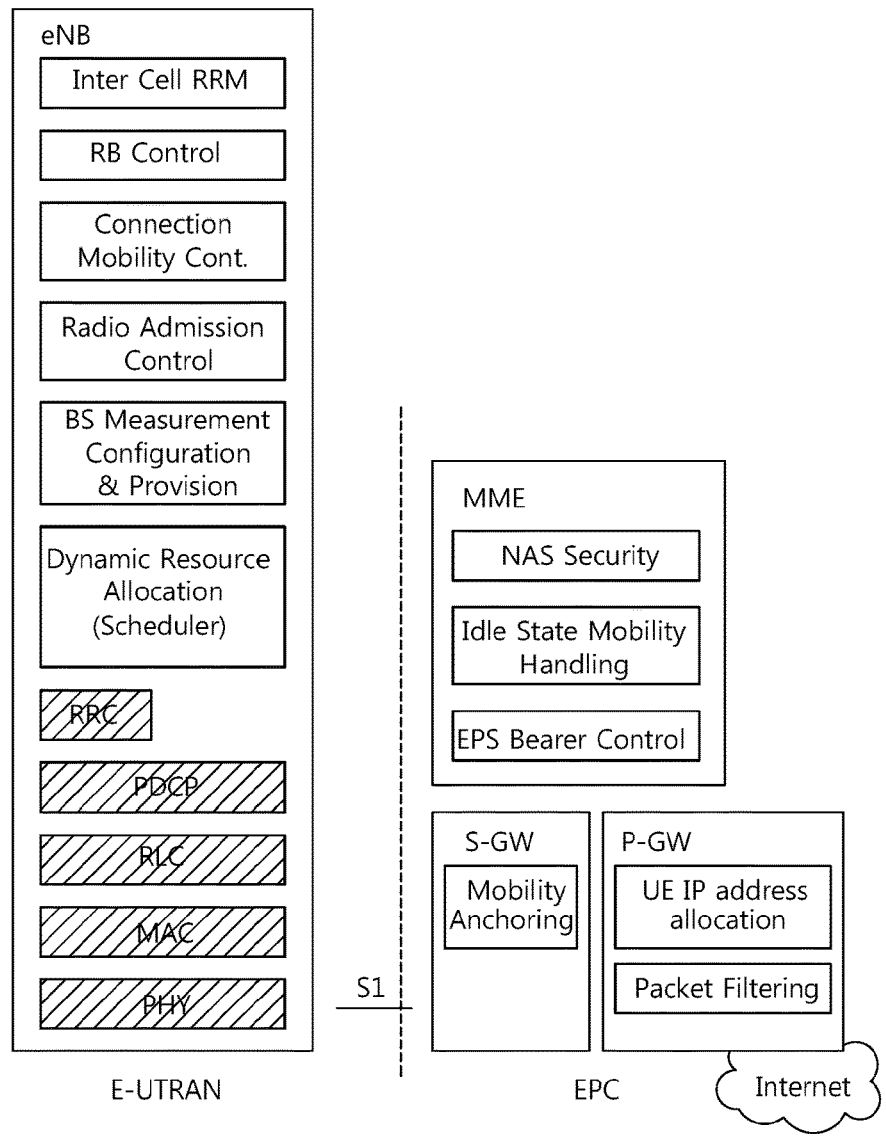
[Fig. 3]
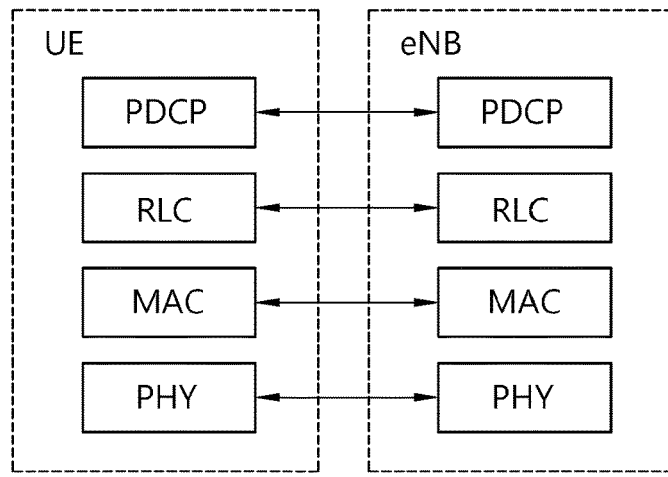

[Fig. 4]
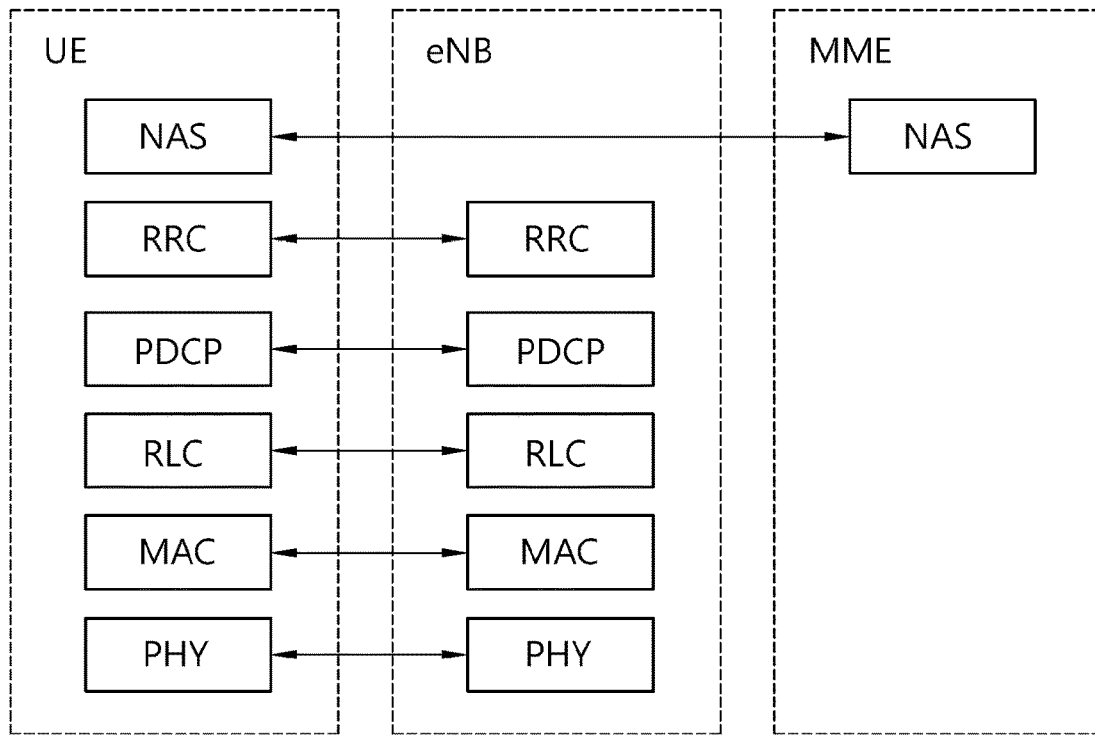
[Fig. 5]
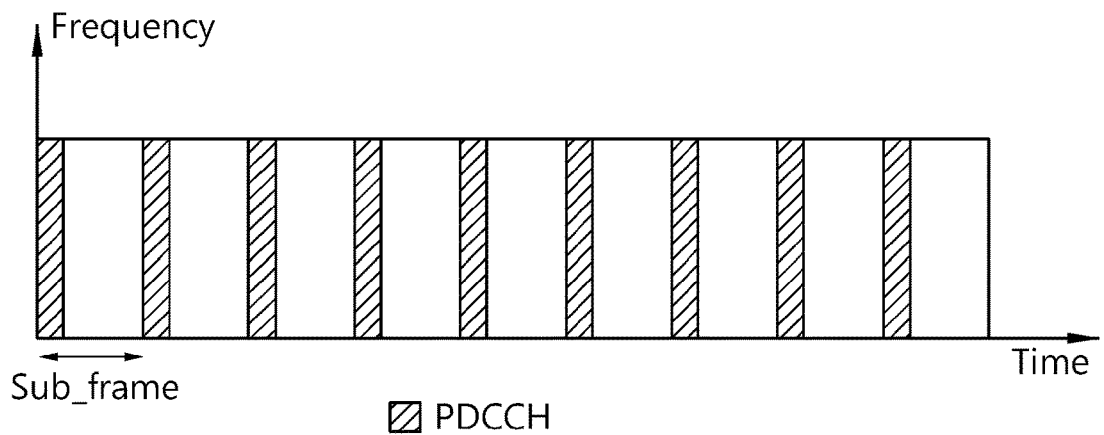
[Fig. 6]
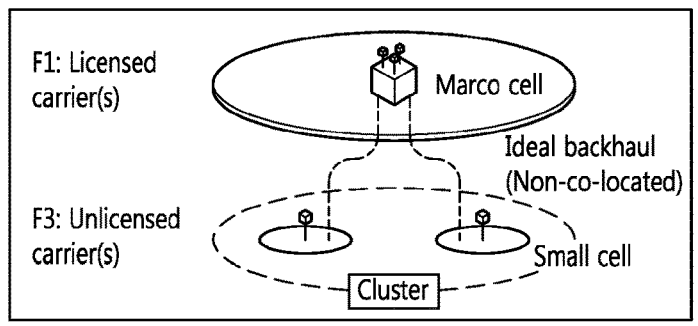

[Fig. 7]
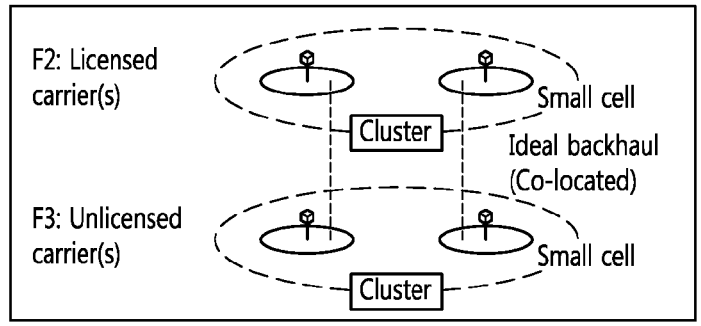
[Fig. 8]
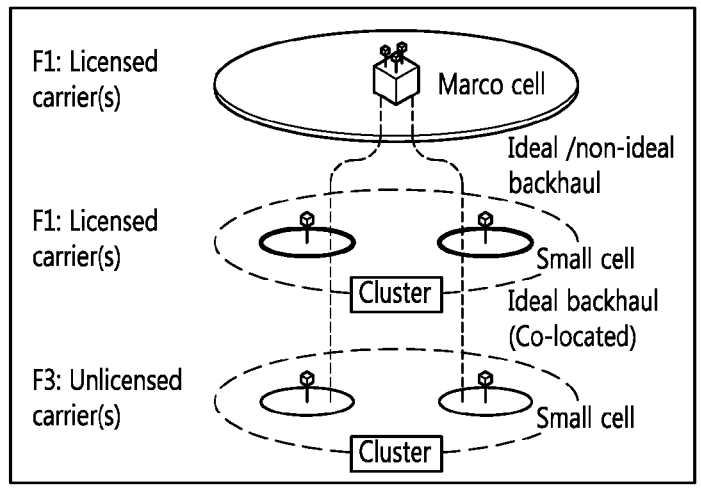
[Fig. 9]
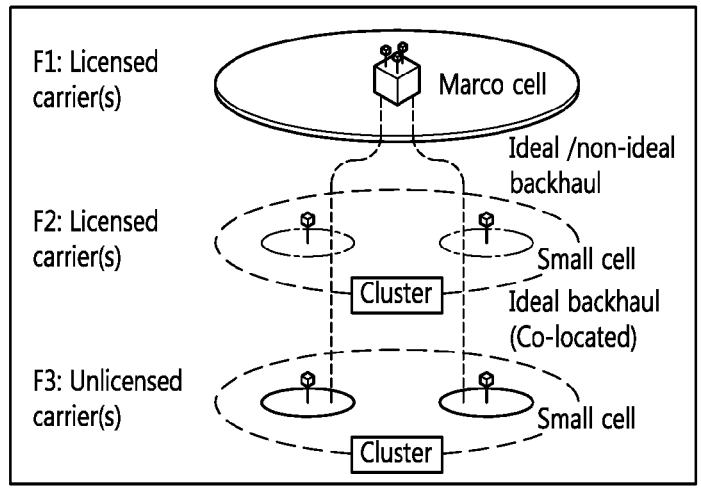

[Fig. 10]
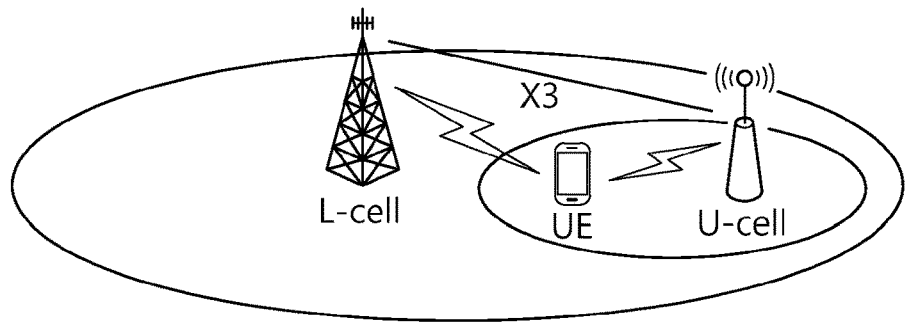
[Fig. 11]
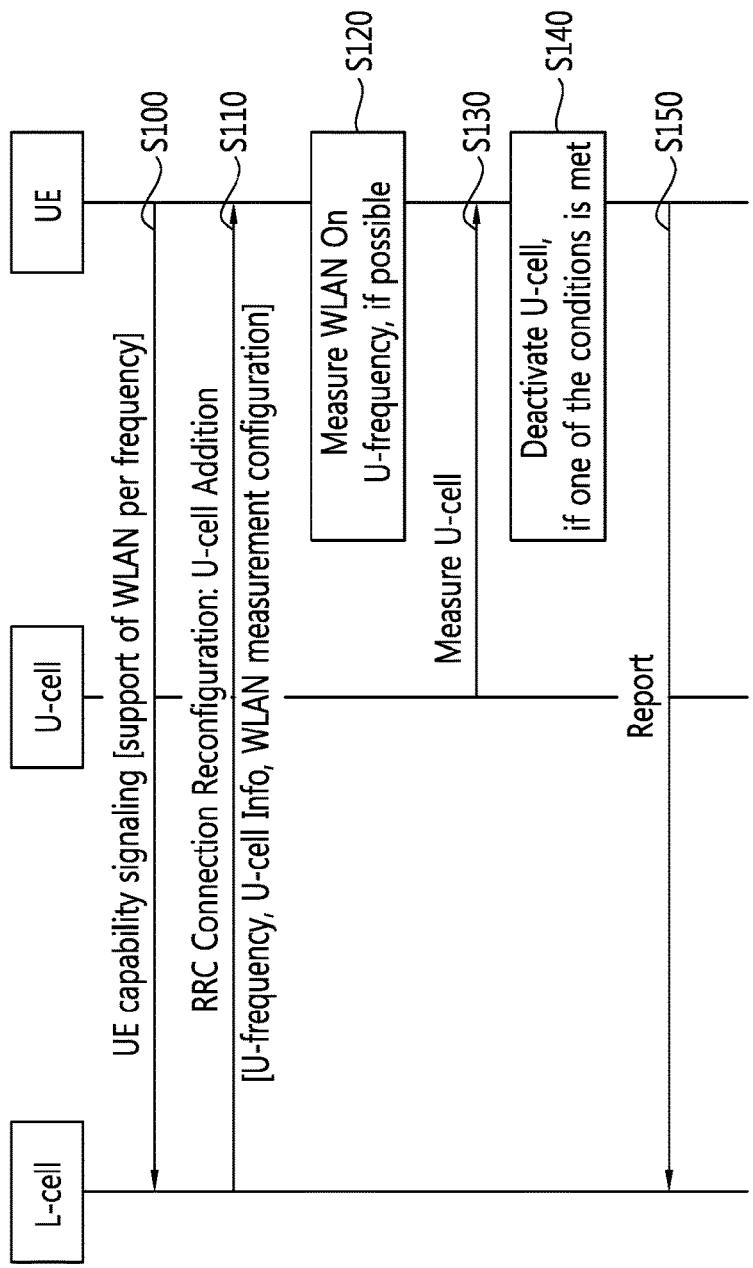

[Fig. 12]
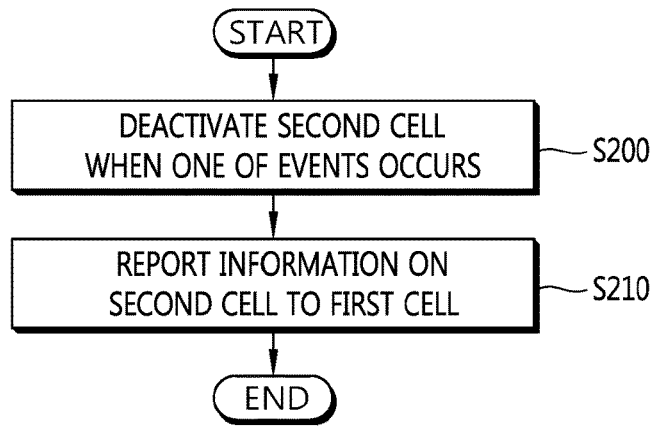
[Fig. 13]
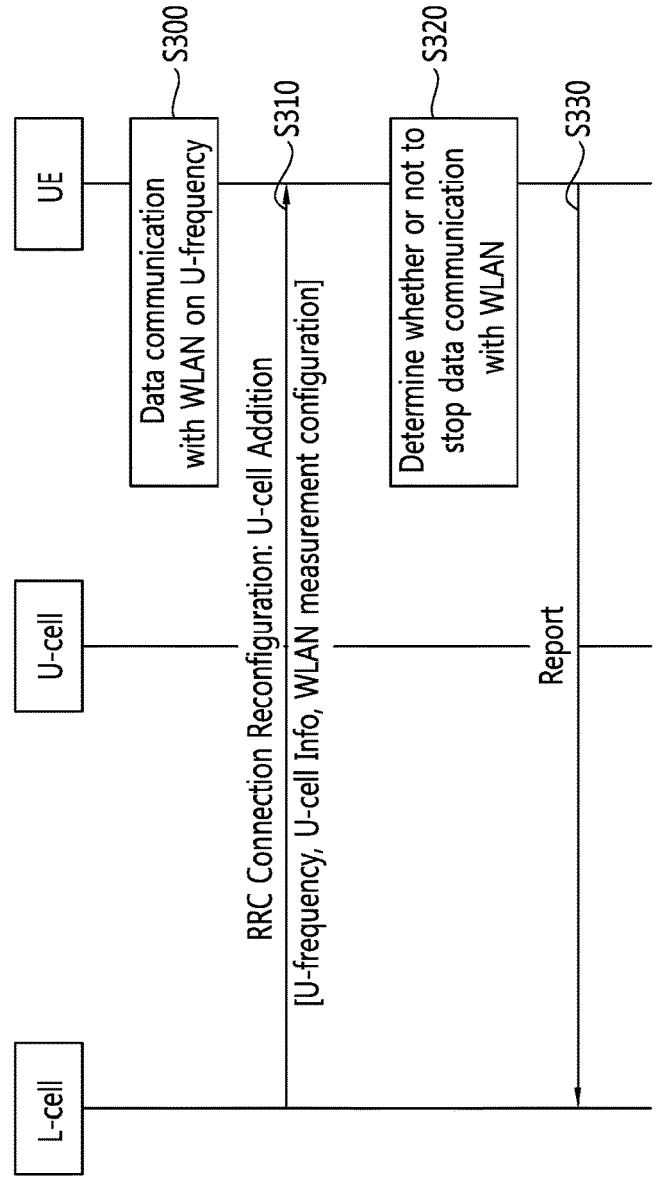

[Fig. 14]
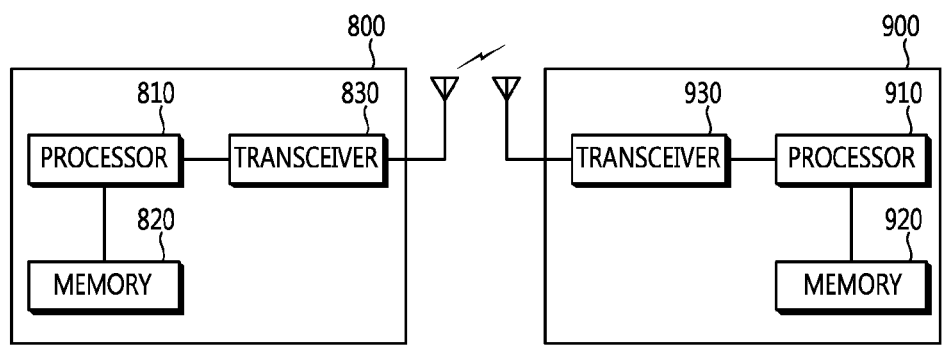

The present invention provides a method and apparatus
METHOD AND APPARATUS FOR HANDLING ABNORMAL SITUATIONS AT CELL OF UNLICENSED CARRIER IN WIRELESS COMMUNICATION SYSTEM

CROSS REFERENCE TO RELATED APPLICATIONS

This application is the National Phase of PCT International Application No. PCT/KR2015/011364, filed on Oct. 27, 2015, which claims priority under 35 U.S.C. 119(e) to U.S. Provisional Application No. 62/072,448, filed on Oct. 30, 2014, all of which are hereby expressly incorporated by reference into the present application.

TECHNICAL FIELD

The present invention relates to wireless communications, and more particularly, to a method and apparatus for handling abnormal situations at a cell of an unlicensed carrier in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The fast uptake of LTE in different regions of the world shows both that demand for wireless broadband data is increasing, and that LTE is an extremely successful platform to meet that demand. At the same time, unlicensed spectrum has been more considered by cellular operators as a complementary tool to augment their service offering. Unlicensed spectrum can never match the qualities of the licensed regime. However, those solutions that allow an efficient use of unlicensed spectrum as a complement to licensed deployments have the potential to bring great value to 3GPP operators, and, ultimately, to the 3GPP industry as a whole. Given the widespread deployment and usage of other technologies in unlicensed spectrum for wireless communications in our society, it is envisioned that LTE would have to coexist with existing and future uses of unlicensed spectrum. Existing and new spectrum licensed for exclusive use by international mobile telecommunications (IMT) technologies will remain fundamental for providing seamless coverage, achieving the highest spectral efficiency, and ensuring the highest reliability of cellular networks through careful planning and deployment of high-quality network equipment and devices.

Complementing the LTE platform with unlicensed spectrum is a possible choice under these considerations, as it would enable operators and vendors to leverage the existing or planned investments in LTE/evolved packet core (EPC) hardware in the radio and core network, especially if licensed-assisted access (LAA) is considered a secondary component carrier integrated into LTE.

The unlicensed spectrum may be used by various types of radio access technologies (RATs), e.g. LAA, Wi-Fi, etc. That is, data transmission on the unlicensed spectrum may be subject to contention. In this case, various types of abnormal situations may happen, and accordingly, a method for handling abnormal situations on the unlicensed spectrum may be required.

DISCLOSURE OF INVENTION

Technical Problem

The present invention provides a method and apparatus for handling abnormal situations at a cell of an unlicensed carrier in a wireless communication system. The present invention provides a method and apparatus for deactivating a cell of the unlicensed carrier when one of events occurs. The present invention provides a method and apparatus for reporting information on a cell of the unlicensed carrier.

Solution to Problem

In an aspect, a method for deactivating, by a user equipment (UE), a cell of an unlicensed carrier in a wireless communication system is provided. The method includes deactivating a second cell when one of events occurs, and reporting information on the second cell to a first cell. The first cell is a first serving cell on a licensed carrier, and the second cell is a second serving cell on the unlicensed carrier.

In another aspect, A user equipment (UE) is provided. The UE includes a memory, a transceiver, and a processor coupled to the memory and the transceiver, and configured to deactivate a second cell when one of events occurs, and control the transceiver to report information on the second cell to a first cell. The first cell is a first serving cell on a licensed carrier, and the second cell is a second serving cell on the unlicensed carrier.

Advantageous Effects of Invention

Abnormal situations at a cell of an unlicensed carrier can be handled efficiently.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows an example of a deployment scenario for LAA.

FIG. 7 shows another example of a deployment scenario for LAA.

FIG. 8 shows another example of a deployment scenario for LAA.

FIG. 9 shows another example of a deployment scenario for LAA.

FIG. 10 shows an example of a scenario for deployments of L-cell and U-cell.

FIG. 11 shows a method for deactivating a cell of an unlicensed carrier according to an embodiment of the present invention.

FIG. 12 shows a method for deactivating a cell of an unlicensed carrier according to another embodiment of the present invention.

FIG. 13 shows a method for stopping WLAN on an unlicensed carrier according to an embodiment of the present invention.

FIG. 14 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Carrier aggregation (CA) is described. It may be referred to Section 5.5 and 7.5 of 3GPP TS 36.300 V12.1.0 (2014 March). In CA, two or more component carriers (CCs) are aggregated in order to support wider transmission bandwidths up to 100 MHz. A UE may simultaneously receive or transmit on one or multiple CCs depending on its capabilities. A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

To support unlicensed spectrum/carrier in LTE, various aspects have been discussed. In some regions in the world, unlicensed technologies need to abide to certain regulations, e.g. listen-before-talk (LBT). Fair coexistence between LTE and other technologies such as Wi-Fi as well as between LTE operators is seen necessary. Even in countries without LBT, regulatory requirements exist to attempt to minimize interference with other users of the unlicensed spectrum. However, it is not enough to minimize interference simply for regulatory aspects. It is also essential to insure that a deployed system will operate as a good neighbor, and not significantly impact legacy systems.

Therefore a study is required to determine a single global solution which enhances LTE to enable licensed-assisted access to unlicensed spectrum while coexisting with other technologies and fulfilling the regulatory requirements. When looking at such enhancements, current LTE physical-layer design should be reused as much as possible. To ensure holistic solutions are considered, in-device, co-channel, and adjacent channel intra and inter RAT coexistence scenarios should be included in the study. This feasibility study will evaluate LTE enhancements for licensed-assisted access to unlicensed spectrum. The detailed objectives are as follows.

(1) Define an evaluation methodology and possible scenarios for LTE deployments, focusing on LTE CA configurations and architecture where a low-power SCell operates in unlicensed spectrum and is either DL-only or contains UL and DL, and where the PCell operates in licensed spectrum and can be either LTE FDD or LTE TDD.

(2) Document the relevant requirements and design targets for unlicensed spectrum deployment, in particular:
Document the relevant existing regulatory requirements for unlicensed spectrum deployment in the 5 GHz bands
Document considerations of introducing licensed-assisted access to unlicensed spectrum whilst highlighting the continued importance/need for licensed spectrum allocations
Identify and define design targets for coexistence with other unlicensed spectrum deployments, e.g. fairness with respect to Wi-Fi and other licensed-assisted access (LAA) services. This should be captured in terms of relevant fair sharing metrics, e.g., that LAA should not impact Wi-Fi services more than an additional Wi-Fi network on the same carrier. These metrics could include, e.g., throughput, latency, etc. This should also capture in-device coexistence (IDC) for devices supporting LAA with multiple other-technology radio modems, where it should, e.g., be possible to detect Wi-Fi networks during LAA operation. This does not imply concurrent LAA+Wi-Fi reception/transmission.

This should also capture co-channel coexistence between different LAA operators and between LAA and other technologies in the same band.

(3) Identify and evaluate physical layer options and enhancements to LTE to meet the requirements and targets for unlicensed spectrum deployments identified in the previous bullet, including consideration of the methods to address the coexistence aspects on unlicensed bands with other LTE operators and other typical use of the band.

(4) Identify the need of and, if necessary, evaluate needed enhancements to the LTE radio access network (RAN) protocols to support deployment in unlicensed spectrum for the scenarios and requirements.

(5) Assess the feasibility of base station and terminal operation of 5 GHz band in con-junction with relevant licensed frequency bands.

The identified enhancements should reuse the features of LTE as much as possible. The study will cover both single and multi-operator scenarios, including the case where multiple operators deploy LTE in the same unlicensed spectrum bands. High priority should be on the completion of the DL only scenario. In LTE CA, UEs are not supposed to receive the current broadcasted system information on a SCell and this assumption may kept for unlicensed spectrum.

FIG. 6 shows an example of a deployment scenario for LAA. Referring to FIG. 6, a macro cell uses resources on a licensed carrier at frequency F1. Multiple small cells use resources on an unlicensed carrier at frequency F3. The macro cell and multiple small cells are connected via ideal backhaul. The macro cell and multiple small cells are non-collocated.

FIG. 7 shows another example of a deployment scenario for LAA. Referring to FIG. 7, a first set of small cells use resources on a licensed carrier at frequency F2. A second set of small cells use resources on an unlicensed carrier at frequency F3. The first set of small cells and the second set of small cells are connected via ideal backhaul. The first set of small cells and the second set of small cells are collocated.

FIG. 8 shows another example of a deployment scenario for LAA. Referring to FIG. 8, a macro cell uses resources on a licensed carrier at frequency F1. A first set of small cells use resources on a licensed carrier at frequency F1. The macro cell and the first set of small cells are connected via ideal or non-ideal backhaul. Further, a second set of small cells use resources on an unlicensed carrier at frequency F3. The first set of small cells and the second set of small cells are connected via ideal backhaul. The first set of small cells and the second set of small cells are collocated.

FIG. 9 shows another example of a deployment scenario for LAA. Referring to FIG. 9, a macro cell uses resources on a licensed carrier at frequency F1. A first set of small cells use resources on a licensed carrier at frequency F2. The macro cell and the first set of small cells are connected via ideal or non-ideal backhaul. Further, a second set of small cells use resources on an unlicensed carrier at frequency F3. The first set of small cells and the second set of small cells are connected via ideal backhaul. The first set of small cells and the second set of small cells are collocated.

For evaluation, the following deployment scenarios may be considered as working assumption.

(1) Three coexistence scenarios should be evaluated.
Coexistence scenario a: Operator #1 deploys Wi-Fi and operator #2 deploys Wi-Fi
Coexistence scenario b: Operator #1 deploys LAA and operator #2 deploys LAA
Coexistence scenario c: Operator #1 deploys Wi-Fi and operator #2 deploys LAA (2) Both outdoor and indoor deployments should be considered in these scenarios.

(3) Coexistence scenarios with single and multiple unlicensed channels should be evaluated.

(4) Asynchronous between different LAA operators are baseline. Synchronous between different LAA operators can also be evaluated.

The UE may transmit data in UL or receive data in DL on a carrier of unlicensed spectrum or a carrier of licensed spectrum. DL reception and UL transmission at unlicensed carrier are subject to contention. For example, DL reception and UL transmission at unlicensed carrier may contend with other radio access technology (RAT) operated at the same carrier, e.g. wireless local area network (WLAN). In this case, abnormal situations, such as congestion, interference, in-device coexistence (IDC) problem, radio link failure, etc., may happen. However, there is no clear solution to handle abnormal situations at a cell of an unlicensed carrier currently.

In order to solve the problem described above, according to an embodiment of the present invention, a method for handling abnormal situations at a cell of an unlicensed carrier may be proposed. In this embodiment, a cell of an unlicensed carrier may be de-activated when one of events occurs, and accordingly, abnormal situations can be handled efficiently. According to another embodiment of the present invention, a method for stopping WLAN on an unlicensed carrier may be proposed. In this embodiment, data communication through WLAN, which contends with a cell of an unlicensed carrier, may be stopped, and accordingly, abnormal situations can be handled efficiently. Hereinafter, L-cell means a cell uses resources on a licensed carrier, and U-cell means a cell uses resources on an unlicensed carrier.

FIG. 10 shows an example of a scenario for deployments of L-cell and U-cell. Referring to FIG. 10, the UE is connected to the L-cell as PCell or primary SCell (PSCell). The UE may be configured with one or more L-cells on L-frequencies (frequencies of licensed spectrum) and one or more U-cells on U-frequencies (frequencies of unlicensed spectrum). The same eNB may control both L-cell and U-cell, or different eNBs may control L-cell and U-cell, respectively. Namely, L-cell and U-cell may belong to one eNB or different eNBs. Inter-eNB interface, which may be called X3 interface, may be defined in case of different eNBs controlling L-cell and U-cell, respectively.

FIG. 11 shows a method for deactivating a cell of an unlicensed carrier according to an embodiment of the present invention.

In step S100, the UE supporting LAA may indicate whether or not to support WLAN per carrier (or per frequency) or per band combination by transmitting the UE capability signaling to the network.

In step S110, the UE configures the first cell (e.g. a PCell or scheduling cell) as a serving cell on the licensed carrier (i.e. L-cell) and the second cell (e.g. a SCell or scheduled cell) as a serving cell on the unlicensed carrier (i.e. U-cell). The first cell may be one of a PCell, a PSCell, a scheduling cell performing cross carrier scheduling toward to a serving cell on the unlicensed carrier. The second cell may be a scheduled cell where the scheduling cell schedules transmission or reception. The second cell may be configured via the RRC connection reconfiguration procedure, which indicates U-cell addition. By the RRC connection reconfiguration procedure, a U-frequency, a U-cell index addressing the second cell may be given to the UE. Further, by the RRC connection reconfiguration procedure, the eNB may configure the UE with WLAN measurement for each access point (AP) or for each carrier including the same unlicensed carrier of the second cell.

In step S120, the UE supporting WLAN may begin to receive and/or measure WLAN signals at the same unlicensed carrier of the second cell, upon addition of the second cell as a serving cell.

In step S130, the UE measures the second cell. Specifically, the UE may measure the number of transport block errors (i.e. block error rate (BLER) based on cyclic redundancy check (CRC) of a transport block) in DL. At the second cell, the UE may count the number of CRC failures for DL transmissions in subframes/TTIs within a moving window. The CRC failure may be counted by 1 either per each received transport block (i.e. one MAC PDU) or per each subframe/TTI. Further, the UE may measure the number of failed transmissions in UL (based on MAC HARQ or RLC ARQ) on the second cell. At the second cell, the UE may count the number of UL (re-)transmissions that receives non-acknowledgement (NACK) as HARQ feedback or ARQ feedback.

In step S150, the UE may deactivate the second cell and suspend transmissions and receptions at the second cell, if one of the following events (configured by the eNB) occurs.

If congestion level of WLAN on the same unlicensed carrier of the second cell is higher than a threshold (configured by the eNB); or
  If interference level on the same unlicensed carrier of the second cell is higher than a threshold (configured by the eNB); or
  If IDC problem on the same unlicensed carrier of the second cell is detected according to criterion configured by the eNB or 3GPP technical specification; or
  If the number of transport block errors within a certain time window at the second cell is higher than a threshold (configured by the eNB), i.e. if BLER measured at the second cell is higher than a threshold; or
  If channel quality of the second cell is lower than a threshold (configured by the eNB); or
  If channel quality of WLAN on the same unlicensed carrier of the second cell is higher than a threshold (configured by the eNB); or
  If a WLAN throughput on the same unlicensed carrier of the second cell is higher than a threshold (configured by the eNB); or
  If uplink transmissions at the second cell fail for a certain time period; or
  If the UE performs data transmission or data reception with WLAN on the same unlicensed carrier of the second cell.

In summary, when transmission/reception at a cell on the unlicensed carrier is not, and/or when transmission/reception through WLAN on the same unlicensed carrier is good enough, and/or when transmission/reception at a cell on the unlicensed carrier and transmission/reception through WLAN on the same unlicensed carrier interfere each other, the UE may deactivate the second cell and suspend transmissions and receptions at the second cell.

In step S160, the UE transmits a report to the eNB. The report may be transmitted (possibly after or before the UE deactivate the second cell. The report may include at least one of the following information.

Status of WLAN: The status of WLAN may include at least one of congestion level in WLAN on the unlicensed carrier of the second cell, (average/maximum) WLAN throughput on the unlicensed carrier of the second cell, channel quality of WLAN on the unlicensed carrier of the second cell, or whether or not data communication in WLAN is ongoing on the unlicensed carrier of the second cell.
  Information on the second cell: The information on the second cell may include at least one of deactivation of the second cell (after or before the UE deactivates the second cell), severe congestion on U-frequency of the second cell, severe interference on U-frequency of the second cell, low quality of the second cell, UL transmission failure on the second cell for a certain period, or DL reception failure on the second cell for a certain period.
  Information on IDC problem: The information on IDC problem may be information included in the IDC indication. Or, the report may be the IDC indication.

FIG. 12 shows a method for deactivating a cell of an unlicensed carrier according to another embodiment of the present invention. In this embodiment, the first cell is a first serving cell on a licensed carrier, and the second cell is a second serving cell on the unlicensed carrier.

In step S200, the UE deactivates a second cell when one of events occurs. The events may include that a number of transport block errors in a certain time window on the second cell is higher than a threshold. For this, the UE may measure the number of transport block errors in DL on the second cell. Measuring the number of transport block errors in DL on the second cell may comprise counting a number of CRC failures for DL transmission within the certain time window. Alternatively, the events may include that UL transmissions on the second cell fail in a certain time period. For this, the UE may measure a number of the failed UL transmissions transport block errors in UL on the second cell. Measuring the number of the failed UL transmission transport block errors in UL on the second cell may comprise counting a number of UL transmissions that receives a NACK. Alternatively, the events may include at least one of that a congestion level of a WLAN on the unlicensed carrier is higher than a threshold, that an interference level on the unlicensed carrier is higher than a threshold, that an IDC problem on the unlicensed carrier is detected, that a channel quality of the second cell is lower than a threshold, that a channel quality of the WLAN on the unlicensed carrier is higher than a threshold, that a WLAN throughput on the unlicensed carrier is higher than a threshold, or that the UE performs data transmission or reception with the WLAN on the unlicensed carrier.

In step S210, the UE reports information on the second cell to a first cell. The information on the second cell may include at least one of the deactivation of the second cell, a congestion of the unlicensed carrier, an interference of the unlicensed carrier, a lower quality of the second cell, an UL transmission failure on the second cell for a certain period, or a DL reception failure on the second cell for a certain period. The information on the second cell may further include a status of a WLAN on the unlicensed carrier. The status of the WLAN on the unlicensed carrier may include at least one of a congestion level of the WLAN on the unlicensed carrier, a WLAN throughput on the unlicensed carrier, a channel quality of the WLAN of the unlicensed carrier, or whether or not data communication in the WLAN on the unlicensed carrier is ongoing. The information on the second cell may further include information on an IDC problem.

FIG. 13 shows a method for stopping WLAN on an unlicensed carrier according to an embodiment of the present invention.

In step S300, the UE may perform data communication with WLAN on the unlicensed carrier.

In step S310, the UE configures the first cell (e.g. a PCell or scheduling cell) as a serving cell on the licensed carrier (i.e. L-cell) and the second cell (e.g. a SCell or scheduled cell) as a serving cell on the unlicensed carrier (i.e. U-cell). The first cell may be one of a PCell, a PSCell, a scheduling cell performing cross carrier scheduling toward to a serving cell on the unlicensed carrier. The second cell may be a scheduled cell where the scheduling cell schedules transmission or reception. The second cell may be configured via the RRC connection reconfiguration procedure, which indicates U-cell addition. By the RRC connection reconfiguration procedure, a U-frequency, a U-cell index addressing the second cell may be given to the UE. Further, by the RRC connection reconfiguration procedure, the eNB may configure the UE with WLAN measurement for each AP or for each carrier including the same unlicensed carrier of the second cell.

In step S320, upon configuring the second cell, the UE determines whether or not to stop data communication with WLAN. If one of the following conditions is met, the UE may determine stopping transmissions and receptions with WLAN on the unlicensed carrier of the second cell and move services from WLAN to LTE including LAA. Otherwise, the UE may perform operation of step S330 described below.

If channel quality of WLAN is lower than a threshold (configured by the eNB) on the same unlicensed carrier of the second cell; or If a WLAN throughput is lower than a threshold (configured by the eNB) on the same unlicensed carrier of the second cell; or If congestion level of WLAN is higher than a threshold (configured by the eNB) on the same unlicensed carrier of the second cell.

In step S330, the UE may transmit a report to the eNB, when the UE determines to continue transmissions and reception with WLAN on the unlicensed carrier of the second cell. The report may indicate whether or not data communication with WLAN is ongoing on the unlicensed carrier of the second cell.

FIG. 14 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for a user equipment (UE) in a wireless communication system, the method comprising:
    configuring a first cell as a first serving cell on a licensed carrier;
    configuring a second cell as a second serving cell on an unlicensed carrier for licensed-assisted access (LAA), wherein the second cell is scheduled by the first cell;
    measuring signals of a wireless local area network (WLAN) on the unlicensed carrier of the second cell;
    detecting that a channel quality of the WLAN on the unlicensed carrier is higher than a first threshold;
    counting a number of uplink (UL) transmissions that receive a non-acknowledgement (NACK) on the second cell within a certain time window;
    deactivating the second cell, when the number of UL transmissions that receive the NACK is higher than a second threshold, upon detecting that the channel quality of the WLAN on the unlicensed carrier is higher than the first threshold; and
    reporting information on the second cell to a first cell, upon deactivation of the second cell,
    wherein the information on the second cell includes deactivation of the second cell and a status of the WLAN on the unlicensed carrier.

2. The method of claim 1, wherein the status of the WLAN on the unlicensed carrier includes at least one of a congestion level of the WLAN on the unlicensed carrier, a WLAN throughput on the unlicensed carrier, a channel quality of the WLAN of the unlicensed carrier, or whether or not data communication in the WLAN on the unlicensed carrier is ongoing.

3. The method of claim 1, wherein the information on the second cell further includes information on an in-device coexistence (IDC) problem.

4. The method of claim 1, further comprising informing whether or not to support a WLAN per carrier or per band combination to the first cell.

5. A user equipment (UE) comprising:
    a memory;
    a transceiver; and a processor coupled to the memory and the transceiver, and configured to:

configure a first cell as a first serving cell on a licensed carrier, configure a second cell as a second serving cell on an unlicensed carrier for licensed-assisted access (LAA), wherein the second cell is scheduled by the first cell, measure signals of a wireless local area network (WLAN) on the unlicensed carrier of the second cell, detect that a channel quality of the WLAN on the unlicensed carrier is higher than a first threshold, count a number of uplink (UL) transmissions that receive a non-acknowledgement (NACK) on the second cell within a certain time window, deactivate the second cell, when the number of UL transmissions that receive the NACK is higher than a second threshold, upon detecting that the channel quality of the WLAN on the unlicensed carrier is higher than the first threshold, and control the transceiver to report information on the second cell to a first cell, upon deactivation of the second cell, wherein the information on the second cell includes deactivation of the second cell and a status of the WLAN on the unlicensed carrier.

* * * * *